United States Patent
Cozzo et al.

(10) Patent No.: US 7,848,389 B2
(45) Date of Patent: Dec. 7, 2010

(54) METHOD AND APPARATUS FOR SCALING PARAMETER ESTIMATION IN PARAMETRIC GENERALIZED RAKE RECEIVERS

(75) Inventors: Carmela Cozzo, Cary, NC (US);
Douglas A. Cairns, Durham, NC (US);
Gregory E. Bottomley, Cary, NC (US);
Ali S. Khayrallah, Cary, NC (US);
Håkan B. Eriksson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1457 days.

(21) Appl. No.: 11/219,626

(22) Filed: Sep. 2, 2005

(65) Prior Publication Data

US 2006/0007990 A1    Jan. 12, 2006

Related U.S. Application Data

(63) Continuation-in-part of application No. 10/800,167, filed on Mar. 12, 2004.

(60) Provisional application No. 60/685,825, filed on May 31, 2005.

(51) Int. Cl.
*H04B 1/69* (2006.01)
(52) U.S. Cl. .................. 375/148; 375/152; 375/343; 375/150
(58) Field of Classification Search .............. 375/103, 375/140, 147, 316, 343, 346, 347, 348, 150, 375/151, 152; 455/501, 63.1
See application file for complete search history.

(56) References Cited

U.S. PATENT DOCUMENTS 5,572,552 A    11/1996    Dent et al.

(Continued)

FOREIGN PATENT DOCUMENTS

EP    1300 999 A1    4/2003

(Continued)

OTHER PUBLICATIONS

Cairns, D. et. al., "Low Complexity Parameter Estimation For The Generalized Rake Receiver." 2004 IEEE 11$^{th}$ Digital Signal Processing Workshop & IEEE Signal Processing Education Workshop. Aug. 1-4, 2004. pp. 191-195.

(Continued)

*Primary Examiner*—Chieh M Fan
*Assistant Examiner*—Aristocratis Fotakis
(74) *Attorney, Agent, or Firm*—Coats & Bennett, P.L.L.C.

(57) ABSTRACT

A wireless communication receiver, such as the receiver included in a wireless communication transceiver implemented in a base station or in a mobile station of a wireless communication network, includes a parametric G-RAKE receiver circuit and a method that compute parametric scaling parameters on a per transmission interval basis. In one embodiment, measured impairment correlations are obtained for an individual transmission slot and used to estimate instantaneous values of the scaling parameters. One or both of those instantaneous values are then constrained according to one or more defined limits. In other embodiments, multiple transmission slots are used to increase the number of measurements available to estimate the scaling parameters, with parameter constraining optionally applied. Further embodiments use iterative methods and/or solve for one parameter, and use the results to obtain the other parameter(s). One or more of these embodiments can be improved through the use of error correction/detection information.

17 Claims, 3 Drawing Sheets

U.S. PATENT DOCUMENTS

| | | | |
|---|---|---|---|
| 5,809,020 | A | 9/1998 | Bruckert et al. |
| 6,006,110 | A * | 12/1999 | Raleigh ............... 455/561 |
| 6,101,399 | A | 8/2000 | Raleigh et al. |
| 6,363,104 | B1 | 3/2002 | Bottomley |
| 6,470,044 | B1 | 10/2002 | Kowalski |
| 6,529,545 | B2 | 3/2003 | Tiirola et al. |
| 6,683,924 | B1 | 1/2004 | Ottosson et al. |
| 6,714,585 | B1 | 3/2004 | Wang et al. |
| 7,010,019 | B2 * | 3/2006 | Reial ............... 375/148 |
| 7,046,963 | B2 * | 5/2006 | Luo et al. ............... 455/67.11 |
| 7,349,379 | B2 * | 3/2008 | Schmidl et al. ............ 370/342 |
| 7,751,511 | B2 * | 7/2010 | Reial et al. ............... 375/346 |
| 2001/0028677 | A1 * | 10/2001 | Wang et al. ............... 375/148 |
| 2002/0057735 | A1 | 5/2002 | Piirainen |
| 2002/0080863 | A1 * | 6/2002 | Nielsen ............... 375/152 |
| 2002/0122470 | A1 | 9/2002 | Heikkila |
| 2002/0150176 | A1 | 10/2002 | Chevalier |
| 2003/0016740 | A1 * | 1/2003 | Jeske et al. ............... 375/227 |
| 2003/0035468 | A1 | 2/2003 | Corbaton |
| 2005/0101279 | A1 * | 5/2005 | Lee et al. ............... 455/278.1 |
| 2005/0201447 | A1 | 9/2005 | Cairns et al. |
| 2006/0007990 | A1 | 1/2006 | Cozzo et al. |
| 2006/0182204 | A1 | 8/2006 | Cairns et al. |

FOREIGN PATENT DOCUMENTS

| | | |
|---|---|---|
| EP | 1 392 000 A1 | 2/2004 |
| WO | WO 01/01595 A1 | 1/2001 |

OTHER PUBLICATIONS

Bottomley, G. et. al., "A Generalized Rake Receiver For DS-CDMA Systems." 2000 IEEE 51$^{st}$ Vehicular Technology Conference Proceedings on May 15-18, 2000 in Tokyo, Japan and New York, New York. May 15, 2000. pp. 941-945. vol. 2 of 3.

Wang, Yi-Pin and Bottomley, G., "Generalized RAKE Reception for Canceling Interference from Multiple Base Station." 2000 Vehicular Technology Conference on Sep. 24-28, 2000 in Piscataway, New Jersey. Sep. 24, 2000. pp. 2333-2339. vol. 5.

Grant, Stephan J., et. al., "Generalized RAKE Receivers for MIMO Systems." IEEE Vehicular Technology Conference, Oct. 6-9, 2003, pp. 424-428.

Fulghum, Tracy, et. al., "Low Complexity Parameter Estimation for the Multi-antenna Generalized Rake Receiver." IEEE 63rd Vehicular Technology Conference, Spring 2006, pp. 1874-1878.

Co-pending U.S. Appl. No. 11/566,820 filed Dec. 5, 2006.

Co-pending U.S. Appl. No. 11/751,109 filed May 21, 2007.

Co-pending U.S. Appl. No. 11/935,840 filed Nov. 7, 2007.

Bottomley et. al., "A Generalized RAKE Receiver for Interference Suppression"; IEE Journal on Selected Areas in Communications; Aug. 2000; 10 pages; vol. 18 No. 8.

Kutz, et. al., On the Performance of a Practical Downlink CDMA Generalized RAKE Receiver; IEEE; 2002; 5 pgs.

Kutz et. al., "Low Complexity Implementation of a Downlink CDMA Generalized RAKE Receiver"; IEEE; 2002; 5 pages.

Tantikovit, et. al., "Joint Multipath Diversity Combining and MLSE Equalization (Rake-MLSE Receiver) for WCDMA Systems", 51$^{st}$ IEEE Vehicular Technology Conference Proceedings; May 15, 2000; pp. 435-439, vol. 1 of 3.

Tantikovit et. al., "On Combining Schemes for W-CDMA RAKE Reception in the Presence of Interpath Interference," 3$^{rd}$ IEEE Signal Processing Workshop on Signal Processing Advances in Wireless Communications; Mar. 20, 2001.

Tantikovit et. al., "A Unified View of RAKE Reception and its Application on Receiver Designs for Multimedia Capable Mobile Terminals in W-CDMA," IEICE Trans. Comm.; Oct. 2002; pp. 1944-1956, vol. E85-B, No. 10.

* cited by examiner

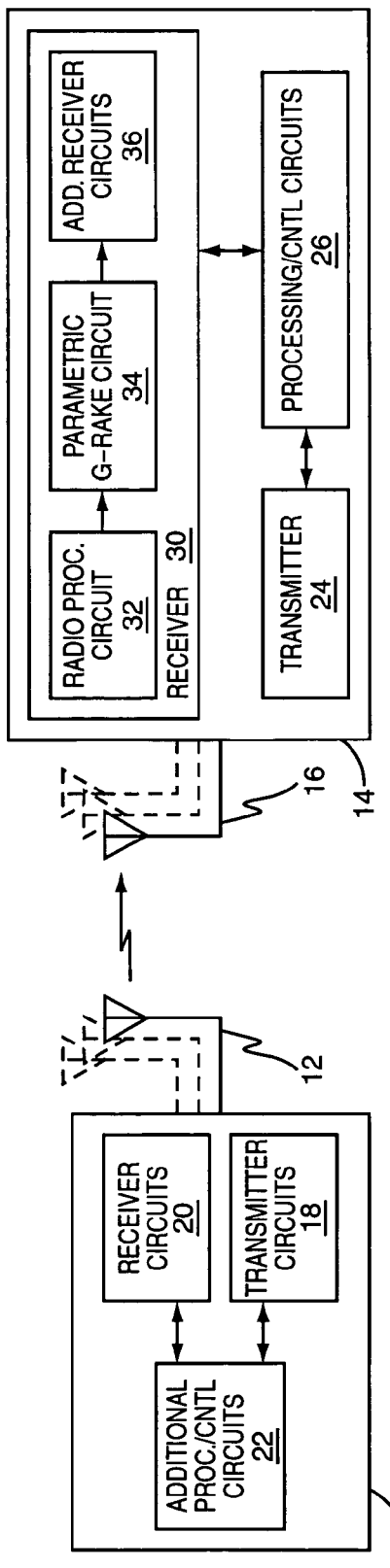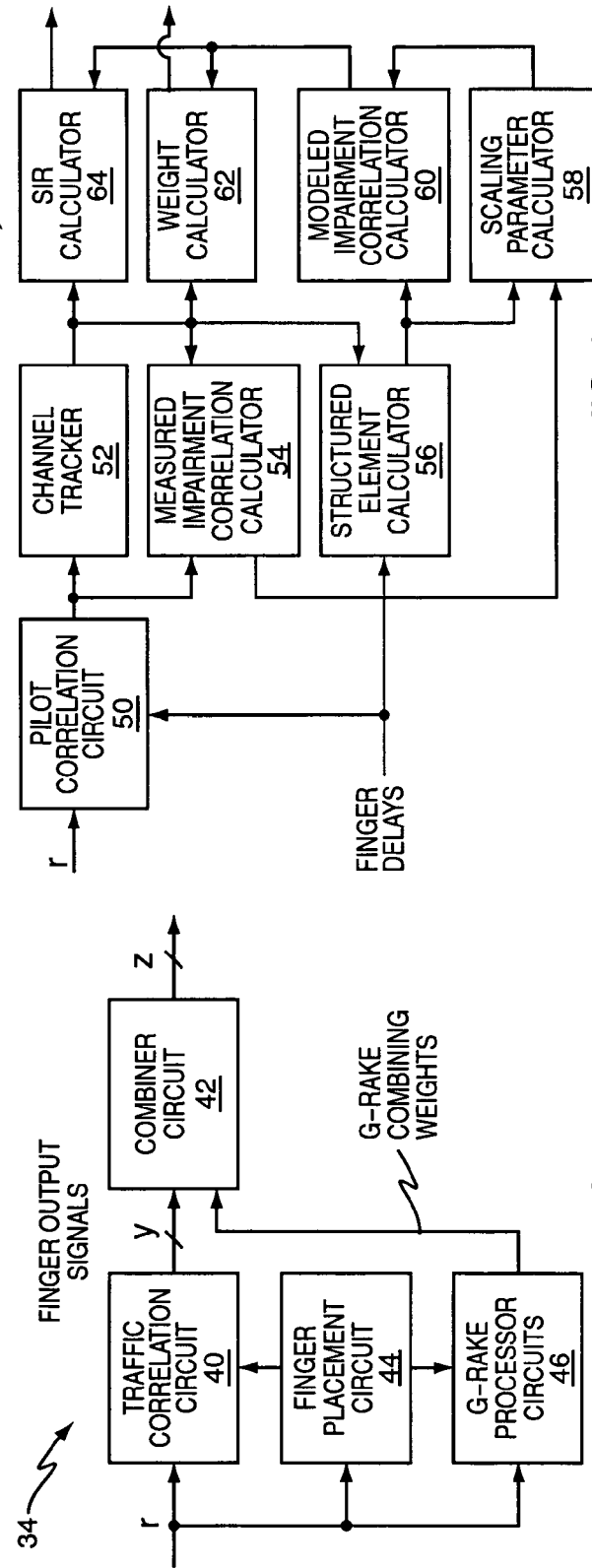

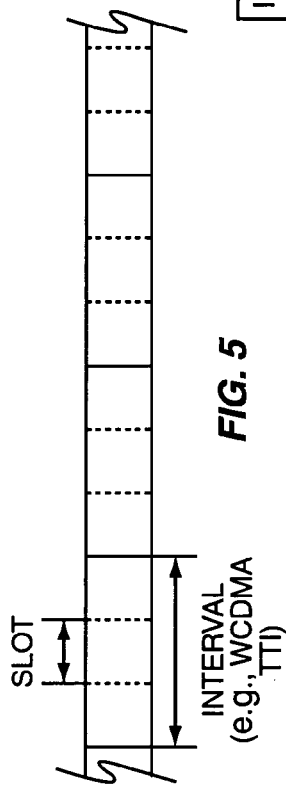
FIG. 5
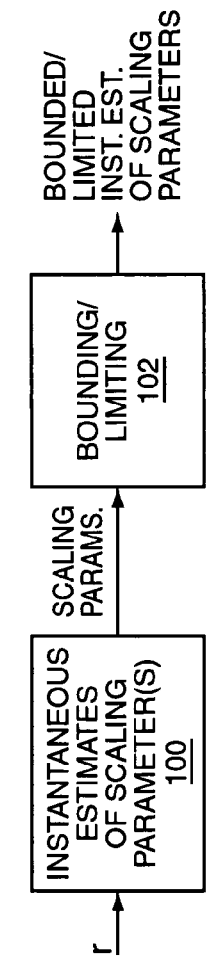
FIG. 4
FIG. 7
FIG. 6

METHOD AND APPARATUS FOR SCALING PARAMETER ESTIMATION IN PARAMETRIC GENERALIZED RAKE RECEIVERS

RELATED APPLICATIONS

The instant application is a continuation-in-part of and claims priority under 35 U.S.C. §120 from the earlier-filed U.S. patent application entitled "Method and Apparatus for Parameter Estimation in a Generalized RAKE Receiver," which was filed on 12 Mar. 2004, and is assigned application Ser. No. 10/800,167. The instant application further claims priority under 35 U.S.C. 119(e) from the provisional patent application entitled "Estimation of Scaling Parameters for Parametric G-RAKE Receiver," which was filed on 31 May 2005 and is assigned Application Ser. No. 60/685,825. These related applications are incorporated in their entireties by reference herein.

BACKGROUND OF THE INVENTION

The present invention relates to wireless communication receivers, and particularly relates to scaling parameter estimation in Generalized RAKE receivers.

With multipath propagation, a receiver receives multiple images of the transmitted signal at different delays corresponding to the different propagation paths. "Standard" RAKE receivers improve reception performance in multipath environments by time aligning each of one or more RAKE fingers with a corresponding one of the propagation path delays. Each RAKE finger outputs despread traffic values from the signal image corresponding to that propagation path delay, and a combining circuit forms a combined signal based on combining the finger outputs according to a set of combining weights. The combining weight assigned to each finger generally is computed as the complex conjugate of the channel tap calculated for that finger's delay path.

If the received signal impairments are uncorrelated across the RAKE fingers, the standard RAKE receiver solution is optimal. However, the presence of correlated impairments in the received signal degrades the performance of the standard RAKE receiver solution, and the performance degradation can be substantial.

For various reasons, such as the use of higher transmission bandwidths for increased data rates, receivers intended for use in the evolving wireless communication networks are more likely to "see" significant levels of colored noise and other correlated impairments in their received signals. As such, the standard RAKE receiver often is not a suitable candidate architecture for receivers intended to operate in such circumstances.

A newer approach, often termed a "Generalized" RAKE (G-RAKE) receiver, improves reception performance in dispersive channel environments by offering a combination of interference cancellation and channel equalization. To gain these improvements over the standard RAKE receiver architecture, the G-RAKE receiver modifies its signal processing operations in a number of significant ways. First, one or more of its fingers are placed off-path, i.e., offset from the path delays measured for the received signal. Second, its combining weights are not strictly channel tap conjugates. Rather, the combining weights are based at least in part on impairment correlation estimates, which allow the combining process to reduce correlated interference in the combined signal.

One type of G-RAKE recognizes that the impairment correlations can be decomposed into constituent elements, and that the underlying "structure" of these constituent elements can be modeled. As used herein, the term "impairment" has a broad definition that includes, but is not limited to, one or more of the following items: adjacent system interference, self and multi-user interference, and noise. Because modeled terms are used in their impairment correlation estimations, these types of G-RAKE receivers are broadly referred to as "parametric" G-RAKE receivers. As an example, the impairment correlations measured for the received signal may be expressed as the sum of modeled interference correlations as scaled by a corresponding model fitting parameter and modeled noise correlations as scaled by a corresponding model fitting parameter. Because the structures of the modeled terms are known, and the short-term impairment correlations may be measured from a set of despread pilot values, for example, the impairment correlation estimation task is reduced to the determination of the appropriate model fitting parameters, which are also referred to as scaling parameters.

However, challenges remain in parametric G-RAKE processing. More particularly, certain conditions make it difficult to maintain appropriately updated scaling parameters. In particular, the scaling parameters depend on the total energy per chip period of the signal, $E_c$, and on the white noise or simply noise power (thermal noise plus other interference), $N_0$. These values change rapidly under certain circumstances, making it difficult for parametric G-RAKE receivers to maintain appropriately updated scaling parameters. Examples include the varying transmission conditions, e.g., widely varying transmission powers, associated with scheduled and non-scheduled users on high-rate shared data channels, such as the High Speed Downlink Shared Channel (HS-DSCH) for High Speed Downlink Packet Access (HSDPA) introduced in Release 5 of the Wideband CDMA (WCDMA) standards. Further, the introduction of the Enhanced Up-Link (EUL) in Release 6 of the WCDMA standards, which also includes strict user scheduling, portends complications for parameter estimation in G-RAKE receiver applications.

SUMMARY OF THE INVENTION

In at least one embodiment of a parametric Generalized RAKE (G-RAKE) receiver circuit as taught herein, parametric scaling parameters used to scale the modeled impairment correlations that, in turn, are used to generate impairment correlation estimates for combining weight computation, are estimated on a per transmission interval basis. As such, the potentially dramatic interval-to-interval changes in the signal conditions bearing on the calculation of the scaling parameters do not upset the scaling parameter estimation process.

Thus, in one embodiment, one or more processing circuits comprising a parametric G-RAKE receiver circuit are configured to estimate the scaling parameter(s) on a per transmission interval basis. Doing so prevents the scaling parameters estimated in one transmission interval of the received communication signal from being influenced by the scaling parameters estimated in another transmission interval of the received communication signal.

In another embodiment, a method of estimating a scaling parameter used to scale modeled impairment correlations in a parametric Generalized RAKE (G-RAKE) receiver comprises, for each of one or more transmission intervals of a received communication signal, obtaining measured impairment correlations over all or part of the transmission interval. The method continues with estimating the scaling parameter by expressing the measured impairment correlations as a function of modeled impairment correlations as scaled by an unknown instantaneous value of the scaling parameter and solving for the instantaneous value.

For example, the measured impairment correlations may be expressed as a function of modeled interference correlations scaled by a first scaling parameter and modeled noise correlations scaled by a second scaling parameter. Instantaneous values for the two scaling parameters may be determined by performing a Least Squares (LS) fitting process. In one variation, one parameter is expressed in terms of the other, and the LS fitting process reduces to solving for one scaling parameter. In other variations, iterative approaches may be used to solve for the parameter(s).

Further, error correction/detection information in the received communication signal, such as Cyclic Redundancy Check (CRC) values, may be used to select candidate scaling parameters from a set of candidates. For example, candidate scaling parameter values can be used to generate combining weights, and the CRCs in decoded information obtained from the received symbol estimates generated from those combining weights can be checked.

Of course, the present invention is not limited by the above features and advantages. Indeed, those skilled in the art will appreciate additional features and advantages upon reading the following detailed description, and upon viewing the accompanying drawings.

BRIEF DESCRIPTION OF THE DRAWINGS

FIG. 1 is a block diagram of wireless communication transceivers, with at least one of them embodying parametric G-RAKE scaling parameter estimation as taught herein.

FIG. 2 is a block diagram of one embodiment of a parametric G-RAKE receiver circuit.

FIG. 3 is a block diagram of additional details for the G-RAKE receiver circuit of FIG. 2.

FIG. 4 is a logic flow diagram for one embodiment of scaling parameter estimation.

FIG. 5 is a diagram of typical slot and interval structures for a received communication signal.

FIG. 6 is a logic flow diagram illustrating a more detailed implementation of the processing logic illustrated in FIG. 4.

FIG. 7 is a logic flow diagram of another embodiment of scaling parameter estimation.

DETAILED DESCRIPTION OF THE INVENTION

Figure 8:
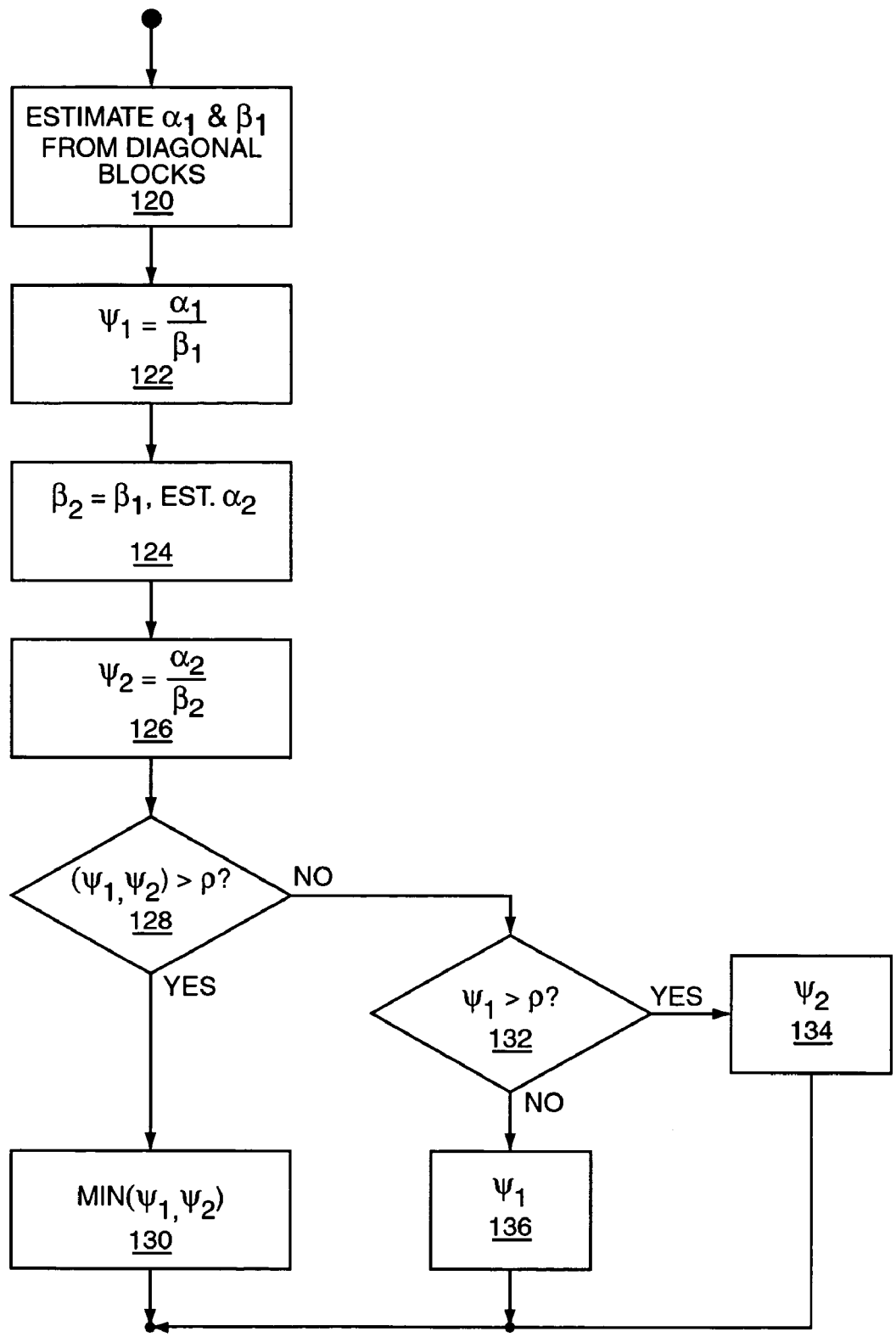
FIG. 8 is a logic flow diagram of another embodiment of scaling parameter estimation.

FIG. 1 is a block diagram of a wireless communication transceiver 10 that is transmitting a communication signal via one or more antennas 12 to another wireless communication transceiver 14, which receives the transmitted signal, plus other signals and noise, via one or more antennas 16. While both of the transceivers 10 and 14 may be similarly configured, the transceiver 14 is shown in more detail, to highlight one or more embodiments of parametric G-RAKE processing as taught herein.

In simplified form, the transceiver 10 comprises one or more transmitter circuits 18, one or more receiver circuits 20, and additional control/processing circuits 22, as needed. The transceiver 14, while still simplified for clarity, illustrates more detail as a basis for discussion and comprises one or more transmitter circuits 24 and additional processing/control circuits 26 as needed, and more particularly comprises one or more receiver circuits 30 that include a radio processor circuit 32, a parametric G-RAKE receiver circuit 34, and additional receiver processing circuits 36 as needed, such as demodulation/decoding circuits that are configured to extract transmitted information bits from the traffic symbol estimates.

It should be understood that, for example, the transceiver 10 may comprise a radio base station in a wireless communication network and the transceiver 14 may comprise a mobile station—e.g., cellular radiotelephone, pager, palmtop computer, PDA, or other mobile communication device. More particularly, the transceiver 10 may comprise a base station configured according to the applicable WCDMA standards and the transceiver 14 may comprise a mobile station configured according to the applicable WCDMA standards. More generally, the transceiver 14 may comprise essentially any type of wireless communication device.

In the WCDMA context, the received communication signal of interest may comprise a HS-DSCH signal (used in HSDPA). The HS-DSCH is a shared packet data channel used to serve multiple users in time-multiplexed fashion based on scheduling which transmission intervals of the HS-DSCH are used to transmit data to particular ones of the users. Each transmission interval, which comprises three transmission slots, thus may be used to serve a different scheduled user. Of course, depending on the amount of data to be sent to a given user, multiple transmission intervals may be scheduled for the same user. For other examples of shared packet channels, a transmission interval may comprise a different number of transmission slots.

In other embodiments, the transceiver 14 may comprise a radio base station, e.g., a WCDMA radio base station. Application of the parametric G-RAKE receiver circuit 34 taught herein to base stations offers a number of advantages, especially under certain reverse link conditions. In particular, the receiver circuit 34 is advantageous when the physical quantities affecting the G-RAKE scaling parameters change rapidly between reverse link transmissions. The Enhanced Uplink (EUL) extension to the WCDMA standard represents one example where the signal conditions influencing the estimation of the scaling parameters can change significantly between transmission intervals of the reverse link signal(s) received at the base station.

Broadly, then, FIG. 1 should be understood as illustrative rather than limiting, and those skilled in the art will appreciate that scaling parameter estimation for parametric G-RAKE processing as taught herein can be implemented in a variety of receiver applications and in a variety of network types. More particularly, the methods taught herein provide for per transmission interval estimation of the scaling parameters to be used for scaling the modeled impairment correlations that are part of G-RAKE processing.

As a starting point for understanding operations of the parametric G-RAKE receiver circuit 34, it should be understood as comprising one or more processing circuits configured to estimate the scaling parameters on a per transmission interval basis, to prevent the scaling parameters estimated in one transmission interval of a received communication signal from being influenced by the scaling parameters estimated in another transmission interval of the received communication signal.

The term "processing circuit" should be broadly construed as connoting functional, but not necessarily physical, structure. For example, the parametric G-RAKE receiver circuit 34 may comprise one or more integrated circuit devices that are configured to carry out the signal processing taught herein. As such, the processing circuit(s) comprising the parametric G-RAKE receiver circuit 34 may comprise one or more microprocessors or DSPs, along with corresponding stored computer program instructions that configure the processing circuit(s) to carry out the desired signal processing. Alternatively, or additionally, the parametric G-RAKE receiver circuit 34 may be implemented using Application Specific Integrated Circuits (ASICs), Field Programmable Gate Arrays (FPGAs), Complex Programmable Logic Devices (CPLDs), or the like.

Turning to processing-related details, it should be noted that the total impairment correlation taken across the RAKE fingers used for despreading the traffic channel component of the received communication signal may be denoted as an impairment correlation matrix R, where the total impairment equals interference plus noise. The impairment correlation matrix R can be expressed analytically as $$R = E_c R_{ISI} + N_0 R_n \qquad \text{Eq. 1}$$

where $E_c$ is the total energy per chip period of the signal, $N_0$ is the noise power, and $R_{ISI}$ and $R_n$ are the modeled interference and noise correlation matrices, respectively. The interference matrix $R_{ISI}$ depends on the pulse shape function, the chip period, the channel coefficients and delays. The noise matrix $R_n$ depends on the pulse shape function and the delays. Note, assuming zero mean, the impairment correlation matrices are covariance matrices.

Because the matrix elements in the modeled impairment correlation matrices $R_{ISI}$ and $R_n$ can be obtained from quantities that are known or that can be learned (such as from the pilot channel component of the received signal), the estimation of R may be thought of the problem of estimating $E_c$ and $N_0$. As a practical matter, the parametric G-RAKE receiver circuit 34 may use the pilot channel to make short-term estimates of the total impairment correlations R. These measured impairment correlations, which are short-term "snapshots," may be denoted as $\hat{R}$, and parametric scaling factors $\alpha$ and $\beta$ may be used in rewriting Eq. 1 to account for any additional scaling needed due to pilot channel estimation. With the parametric scaling factors, Eq. 1 may be rewritten as $$R = \alpha R_{ISI} + \beta R_n \qquad \text{Eq. 2}$$

where $\alpha$ is a first parametric G-RAKE scaling parameter used to scale the modeled interference correlations captured in $R_{ISI}$, and $\beta$ is a second parametric G-RAKE scaling parameter used to scale the modeled noise correlations captured in $R_n$.

In Eq. 2, $R_{ISI}$ is given by $$R_{ISI}(d_1, \tilde{d}_2) = \sum_{l=0}^{L-1} \sum_{q=0}^{L-1} g_l \tilde{g}_q^* \sum_{\substack{m=-\infty \\ m \neq 0}}^{m=\infty} R_p(d_1 - mT_c - \tau_l) R_p^*(\tilde{d}_2 - mT_c - \tilde{\tau}_q) \qquad \text{Eq. 3}$$

and $R_n$ is given by $$R_n(d_1, \tilde{d}_2) = R_p(d_1 - \tilde{d}_2) \delta(\alpha(d_1) - \alpha(\tilde{d}_2)) \qquad \text{Eq. 4}$$

where the tilde indicates that $\tilde{d}_2$ may correspond to a different one of the receive antennas 16 than $d_1$, and where $$g(\tau) = \sum_{l=0}^{L-1} g_l \delta(t - \tau_l)$$

represents the complex (pilot) channel medium model, $R_p(\tau)$ is the (filter) pulse shape autocorrelation function, $T_c$ is the chip period of the received signal, $d_k$ is the delay of the $k^{th}$ G-RAKE finger, and $\alpha(d)$ indicates which one of the receive antennas 16 d corresponds to (e.g., receive antenna 1, 2, etc.). Also, note that the g values are channel coefficients corresponding to the pilot channel (i.e. channel coefficients scaled by pilot channel strength for the corresponding path delays).

FIGS. 2 and 3 provide non-limiting examples of circuit implementation details to support the above processing. In FIG. 2, one sees that a working functional implementation of the parametric G-RAKE receiver circuit 34 comprises a traffic correlation circuit 40, a combiner circuit 42, a finger placement circuit 44, and G-RAKE processing circuits 46.

The traffic correlation circuit 40 includes a number of traffic channel "fingers" (despreading correlators). Each traffic channel finger outputs despread traffic values y from the received communication signal, r, output by the radio processor circuit 32—e.g., n-bit digital values corresponding to time-domain samples of the composite, antenna-received signal(s). Thus, for each channelization code of interest, the traffic correlation circuit 40 outputs a vector y of despread traffic values, with the length of the vector set by the number of fingers assigned to that channelization code.

In turn, the despread traffic values corresponding to the same symbol period for the same channelization code are combined by the combiner circuit 42 using interference-reducing combining weights. More specifically, the combiner circuit 42 uses combining weights that are formed based at least in part on parametrically determined received signal impairment correlations. The combining weights are given by $w = R^{-1}h$, where h is a vector of net channel coefficients corresponding to the G-RAKE finger delays. These combining weights are used to combine the despread traffic value vector elements to form traffic symbol estimates, z, which are provided to the additional receiver circuits 36, e.g., for demodulation/decoding ($z = w^H y$).

The G-RAKE processing circuits 46 determine the appropriate combining weights based on channel estimation information and finger placement information from the finger placement circuit 44, and on having access to samples of the received communication signal r. FIG. 3 illustrates functional circuit details for one embodiment of the G-RAKE processing circuits 46, wherein it comprises a pilot correlation circuit 50, a channel tracker 52, a measured impairment correlation calculator 54, a structured element calculator 56, a scaling parameter calculator 58, a modeled impairment correlation calculator 60, a combining weight calculator 62, and a signal quality estimator 64, which may be a Signal-to-Interference Ratio (SIR) estimator.

In operation, samples of the received communication signal are provided to the pilot correlation circuit 50, which correlates the received samples to a pilot or other reference signal spreading sequence, and removes symbol modulations to produce (pilot) correlation values. Correlations are performed at the finger delays provided by the finger placement circuit 44. The channel tracker circuit 52 receives these pilot correlations and uses them to estimate or otherwise track channel coefficients for the received signal. These coefficients are provided to the measured impairment correlation calculator 54, which also receives the pilot correlations. The calculator 54 is configured to obtain short-term measurements of impairment correlations for the received communication signal—i.e., "snapshot" impairment correlation measurements, $\hat{R}$, on a per transmission slot basis, for example—by subtracting channel estimates from the pilot correlations to obtain impairment samples and correlating the impairment samples with each other and with themselves.

Further, the structured element calculator 56 receives the channel estimates as well as finger delays from the finger placement circuit 44, and it uses these to construct the elements corresponding to the modeled impairment correlation matrices $R_{ISI}$ and $R_n$. The short-term impairment correlation measurements $\hat{R}$ and the modeled impairment correlations $R_{ISI}$ and $R_n$ are provided to the scaling parameter calculation circuit 58, which uses them to calculate the parametric scaling parameters needed, e.g., $\alpha$ to scale the $R_{ISI}$ matrix and $\beta$ to scale the $R_n$.

In turn, the modeled impairment calculator 60 is configured to generate a modeled estimate of impairment correlations for the received communication signal based on the scaling parameters and the modeled impairment correlations, e.g., $R=\alpha R_{ISI}+\beta R_n$. From that calculation, the weight calculator 62 generates combining weights for combining the vector of despread traffic values output by the traffic correlation circuit 40. Note, too, that channel estimates and the modeled estimate of impairment correlations also may be provided to the SIR calculator 64, which produces a SIR estimate for power control purposes, among other uses.

With the above framework in mind, FIG. 4 broadly illustrates an embodiment of scaling parameter estimation as taught herein for received communication signals that are transmitted, or are otherwise processed, according to defined slots and/or intervals. For example, FIG. 5 illustrates a given window of time for a received communication signal of interest, and illustrates the logical division of the signal into fixed-length, repeating transmission slots that are grouped together into repeating transmission intervals.

In the illustration, one transmission interval comprises three transmission slots, and this illustrated configuration corresponds to the WCDMA standard adoption of three slots per Transmission Time Interval (TTI) for HSDPA transmissions. More particularly, HSDPA transmissions comprise three-slot TTIs of 2 ms width. Each TTI may be used to transmit data to a different scheduled user. Further, scheduled transmissions may use two or more consecutive TTIs, depending upon the amount of data to be transmitted to a particular user. Similar scheduled transmissions may be used on WCDMA reverse links, at least with the EUL provisions of Release 6 of the WCDMA standards.

In such circumstances—e.g., short TTIs, and rapidly changing transmission powers—carrying the measurements and/or calculations used to calculate the scaling parameters across transmission intervals can be problematic. Thus, the scaling parameter calculations taught herein provide a method for computing the parameters $\alpha$ and $\beta$ in a manner that ensures good receiver performance for short TTIs and (potentially) rapid transmitter power variations.

More generally, the methods taught herein provide a basis for calculating robust (reliable) scaling parameters on a per transmission interval basis to prevent the scaling parameters calculated in one transmission interval from influencing their calculation in another transmission interval. In broad terms, the transmission interval/slot structure of the received signal may be imposed by the transmission method, or may be logically imposed by the parametric G-RAKE receiver circuit 34.

Regardless, FIG. 4 in particular illustrates an embodiment where scaling parameter calculation comprises estimating instantaneous values of one or more scaling parameters (Step 100), and then bounding or otherwise limiting the instantaneous value(s) (Step 102). In one specific embodiment of this approach, each transmission interval comprises one or more transmission slots, and estimating the scaling parameters on a per transmission interval basis comprises estimating the scaling parameters on a per slot basis.

Estimating the scaling parameters on a per slot basis comprises obtaining measured impairment correlations for the transmission slot, generating instantaneous values for the scaling parameters based on the measured impairment correlations, and constraining the scaling parameters according to one or more defined limits. More particularly, the parametric G-RAKE receiver circuit 34 in FIG. 1 (e.g., the scaling parameter calculator 58 in FIG. 3) is configured to express the measured impairment correlations ($\hat{R}$) as an approximate function of the modeled interference correlations ($R_{ISI}$) scaled by a first scaling parameter ($\alpha$) and the modeled noise correlations ($R_n$) scaled by a second scaling parameter ($\beta$), and to solve the function for the first and second scaling parameters.

That is, given the receiver's ability to know or determine $\hat{R}$, $R_{ISI}$, and $R_n$, which includes its knowledge or determination of the channel (coefficients $g_l$ and delays $\tau_l$), and the G-Rake finger delays d, every quantity in $$\hat{R} \approx \alpha R_{ISI} + \beta R_n \qquad \text{Eq. 5}$$

is known except for $\alpha$ and $\beta$. To isolate the unknowns, the parametric G-RAKE receiver circuit 34 (e.g., the scaling parameter calculator 58) can be configured to stack the columns of $\hat{R}$, $R_{ISI}$, and $R_n$ as $$\begin{bmatrix} \hat{r}_1 \\ \hat{r}_2 \\ \vdots \\ \hat{r}_K \end{bmatrix} \approx \begin{bmatrix} r_{ISI,1} & r_{n,1} \\ r_{ISI,2} & r_{n,2} \\ \vdots & \vdots \\ r_{ISI,K} & r_{n,K} \end{bmatrix} \begin{bmatrix} \alpha \\ \beta \end{bmatrix} \qquad \text{Eq. 6}$$

where $\hat{r}_i$ equals the $i^{th}$ column of the measured impairment correlation matrix $\hat{R}$, $r_{ISI,i}$ equals the $i^{th}$ column of the modeled interference correlation matrix $R_{ISI}$, and $r_{n,i}$ equals the $i^{th}$ column of the modeled noise correlation matrix $R_n$. This system of equations can be solved via least squares (LS) fitting process. The LS fitting process can be expressed as $$\begin{bmatrix} \alpha \\ \beta \end{bmatrix} = (A^H A)^{-1} A^H p \qquad \text{Eq. 7}$$

where $$A = \begin{bmatrix} r_{ISI,1} & r_{n,1} \\ r_{ISI,2} & r_{n,2} \\ \vdots & \vdots \\ r_{ISI,K} & r_{n,K} \end{bmatrix}, p = \begin{bmatrix} \hat{r}_1 \\ \hat{r}_2 \\ \vdots \\ \hat{r}_K \end{bmatrix} \qquad \text{Eq. 8}$$

Note that this least square fitting need not be applied to all elements in the measured impairment correlation matrix, $\hat{R}$. For example, only the diagonal elements and the first off-diagonal elements could be used to perform the fitting operation. In general, $\hat{R}$ is Hermitian symmetric, so only the diagonal and one of the upper or lower triangles would be used. This property can be used throughout, so that only unique matrix elements need to be computed and stored.

There are several aspects to the above-illustrated LS fitting process worth mentioning in further detail. First, the impairment covariance matrix R is of dimension N×N, where N is the number of probing fingers used by the parametric G-RAKE receiver circuit 34. Simulation work done for parametric G-RAKE processing indicates that the instantaneous estimates of α and β provide good demodulation performance as long as N≧8. With the use of eight or more probing fingers, the parametric G-RAKE receiver circuit 34 may employ the fitting procedure described by Eq. 7 and Eq. 8 on a short-term basis (e.g., every slot, every other slot, etc.).

However, there are two aspects of the procedure described by Eq. 7 and Eq. 8 that bear additional explanation. First, the equations are given for simplicity of description only. In actuality, the parametric G-RAKE receiver circuit 34 would only use the matrix elements that corresponded to the upper (lower) triangular portion of the measured and modeled impairment correlation matrices. All of the upper (lower) triangular elements of these matrices generally should be used to ensure good demodulation performance.

A second point worth noting is that the parametric G-RAKE receiver circuit 34 has some a priori knowledge that it can exploit for simplification of its calculations, i.e., it may exploit the knowledge that the scaling parameters α and β are real-valued numbers to simplify the LS fitting problem. To illustrate this point, one may rewrite Eq. 5 as $$Re\{R\}+jIm\{R\}=\alpha(Re\{R_{ISI}\}+jIm\{R_{ISI}\})+\beta(Re\{R_n\}+jIm\{R_n\}) \quad \text{Eq. 9}$$

where Re{ } is an operator that returns the real part of a complex value, Im{ } is an operator that returns the imaginary part of a complex value, and j is the square root of −1.

By collecting real and imaginary terms, one can reformulate Eq. 6 as $$\begin{bmatrix} Re\{\hat{r}_1\} \\ Im\{\hat{r}_1\} \\ Re\{\hat{r}_2\} \\ Im\{\hat{r}_2\} \\ \vdots \\ Re\{\hat{r}_K\} \\ Im\{\hat{r}_K\} \end{bmatrix} = \begin{bmatrix} Re\{r_{ISI,1}\} & Re\{r_{n,1}\} \\ Im\{r_{ISI,1}\} & Im\{r_{n,1}\} \\ Re\{r_{ISI,2}\} & Re\{r_{n,2}\} \\ Im\{r_{ISI,2}\} & Im\{r_{n,2}\} \\ \vdots & \vdots \\ Re\{r_{ISI,K}\} & Re\{r_{n,K}\} \\ Im\{r_{ISI,K}\} & Im\{r_{n,K}\} \end{bmatrix} \begin{bmatrix} \alpha \\ \beta \end{bmatrix} \quad \text{Eq. 10}$$

Because all the elements of Eq. 10 are real, the solution for α and β becomes $$\begin{bmatrix} \alpha \\ \beta \end{bmatrix} = (A^T A)^{-1} A^T p \quad \text{Eq. 11}$$

where $$A = \begin{bmatrix} Re\{r_{ISI,1}\} & Re\{r_{n,1}\} \\ Im\{r_{ISI,1}\} & Im\{r_{n,1}\} \\ Re\{r_{ISI,2}\} & Re\{r_{n,2}\} \\ Im\{r_{ISI,2}\} & Im\{r_{n,2}\} \\ \vdots & \vdots \\ Re\{r_{ISI,K}\} & Re\{r_{n,K}\} \\ Im\{r_{ISI,K}\} & Im\{r_{n,K}\} \end{bmatrix}, \; p = \begin{bmatrix} Re\{\hat{r}_1\} \\ Im\{\hat{r}_1\} \\ Re\{\hat{r}_2\} \\ Im\{\hat{r}_2\} \\ \vdots \\ Re\{\hat{r}_K\} \\ Im\{\hat{r}_K\} \end{bmatrix} \quad \text{Eq. 12}$$

Note that the diagonal elements of $\hat{R}$, $R_{ISI}$, and $R_n$ yield purely real equations.

With the above processing steps, as summarized in FIG. 4, the parametric G-RAKE receiver circuit 34 allows for the measurements and calculations supporting the LS-based estimation of instantaneous values for the scaling parameters to be done on a per slot basis. In turn, the per slot calculations allow independence between the scaling parameters calculated in one transmission interval from those calculated in another transmission interval.

However, to ensure that the instantaneous values are robust, the method includes the illustrated bounding step. That is, the illustrated method constrains the scaling parameters according to one or more defined limits by limiting or otherwise bounding one or both of the instantaneous values. For example, the instantaneous value calculated for the second scaling parameter β may be constrained according to the value of the first scaling parameter α.

The step of thresholding (bounding) one or both of the scaling parameters may be optional for single-antenna implementations of the transceiver 14. In such cases, the LS fitting step yielding the instantaneous estimates of α and β may provide sufficient demodulation performance. However, simulations for embodiments using multiple receive antennas 16 suggest that the block error rate (BLER) curves may have undesirably high error floors when the instantaneous values of α and/or β are used without bounding. The rise in error floor relates to variations in the ratio of the estimated scaling parameters, $$\left(\text{e.g. } \psi = \frac{\alpha}{\beta}\right).$$

It appears that the least squares estimation procedure can cause β to become quite small (with respect to α) or even negative. The phenomenon may be more pronounced in EUL and HS-DSCH scenarios, because the interference term is the dominant impairment in those cases. In any case, variations in the parameter ratio can cause large variations in soft information used by decoder circuits in the transceiver 14. Such variations thus cause potentially poor decoder performance, resulting in high decoding error floors.

One example of parameter constraining is based on monitoring the relative values of α and β, and determining whether the ratio exceeds a certain (defined) thresholding value ρ. The thresholding value may be determined empirically, such as through simulation, for example. With this approach to parameter constraining, the instantaneous value of α as generated by the LS fitting process for a given slot or interval is kept the same (as long as it is positive), but the instantaneous value of β is set to $$\beta = \alpha\left(\frac{1}{\rho}\right).$$

Here, it should be noted that, in a practical implementation, the parametric G-RAKE receiver circuit 34 uses the pilot channel in the estimation of α and β, and this practical detail means that α no longer represents the chip energy $E_c$, but rather the ratio of chip to pilot energy given as $$\frac{E_c}{E_p}.$$

Because the threshold(s) used to bound or otherwise limit $\beta$ are predicated on $$\frac{E_c}{E_p},$$

the parametric G-RAKE receiver circuit 34 must estimate $E_p$. A simple approach to estimating $E_p$ is by averaging $h^H h$ over time. This average can be computed with an exponential filter of the form $$E_p(n)=\gamma E_p(n-1)+(1-\gamma)h^H h \qquad \text{Eq. 13}$$

where $\gamma$ is a constant between 0 and 1.

Incorporating the estimate of $E_p$ into this embodiment gives the following relationship for $\beta$ $$\beta = \max\left(\beta, \frac{\alpha E_p}{\rho}\right) \qquad \text{Eq. 14}$$

In Eq. 14, the max (A,B) function returns the maximum (signed) value of A and B.

FIG. 6 illustrates an example of the above approach to scaling parameter constraining, wherein the instantaneous estimates of $\alpha$ and/or $\beta$ calculated on a per slot or per interval basis are bounded, such that the estimates of $\alpha$ and $\beta$ are robust enough for combining weight generation and subsequent symbol estimation and decoding.

Processing begins with generating instantaneous estimates of $\alpha$ and $\beta$, such as on a per slot basis, according to the above LS fitting process (Step 110), and continues with an estimation of pilot energy, $E_p$, such as detailed above (Step 112). Processing continues with evaluation of the expression $$\beta > \frac{\alpha E_p}{\rho} \qquad \text{Eq. 15}$$

where $\rho$ is a desired (fixed or adjustable) thresholding constant (Step 114). If the scaling parameter $\beta$ is greater than the evaluated quantity, then the working value of $\beta$ used for subsequent calculations is set to the instantaneous value of $\beta$ (Step 116). If not, then working value $\beta$ is set to the constrained value $$\beta = \frac{\alpha E_p}{\rho}$$

(Step 118).

Of course, the processing logic of FIG. 6 represents a non-limiting example, and it should be understood that different methods for producing robust instantaneous values of the scaling parameters may be used as needed or desired. For example, another embodiment monitors the value of $\beta$ obtained from the least squares procedure. If $\beta$ is negative or zero, $\beta$ can be set to a nominal value $\epsilon$. Alternatively, $\beta$ can be set to a fraction of $\alpha$. For example, if $\beta<\epsilon$, then set $\beta$ to $\epsilon$.

In another embodiment, the parametric G-RAKE receiver circuit 34 monitors the ratio $\psi$ and $\beta$, and thresholds $\beta$. For example, if the ratio $\Psi$ exceeds a certain threshold value $\rho$, or if the value of $\beta<\epsilon$, $\beta$ is set to $$\beta = \frac{\alpha}{\rho}.$$

In another embodiment, the parametric G-RAKE receiver circuit 34 monitors the ratio $\psi$. If the ratio $\psi$ exceeds the threshold value $\rho$, then the instantaneous values of $\alpha$ and $\beta$ as calculated from the LS fitting process for the current transmission slot are replaced by the instantaneous values calculated in the previous slot. Of course, this embodiment generally is not used for the first slot of a given transmission interval to prevent scaling parameter values from being reused across transmission intervals. However, with that caveat, it is clear that previously calculated in-bounds scaling parameter values from a prior transmission slot of the same transmission interval can be re-used to replace out-of-bounds scaling parameter values calculated in a subsequent transmission slot.

In another embodiment, the parametric G-RAKE receiver circuit 34 computes the ratio $\psi$ for the first slot of a given transmission interval, e.g., a given TTI. If the ratio is less than a threshold value $\rho$, then the values $\alpha$ and $\beta$ are frozen and used for all slots in the transmission interval. This embodiment thus may save computational cycles since the LS estimation of $\alpha$ and $\beta$ need only be done once per transmission interval. However, values of $\alpha$ and $\beta$ generally are not frozen from a prior transmission interval for carryover into a subsequent transmission interval. One exception to this is where the parametric G-RAKE receiver circuit 34 is processing a scheduled transmission (directed to it) over successive transmission intervals. Such circumstances might arise, for example, if the transceiver 14 is one of several scheduled users sharing a HS-DSCH in a WCDMA network. Also, it may be desirable as a general proposition, regardless of thresholding, to freeze $\alpha$ and $\beta$ for an entire transmission interval and/or to limit the variation of $\psi$.

In another embodiment, the parametric G-RAKE receiver circuit 34 monitors the ratio $\psi$. If the ratio exceeds a threshold $\rho$, then the LS fitting procedure is reapplied to only estimate the parameter $\alpha$. For the re-estimation of $\alpha$, Eq. 2 becomes $$R = \alpha R_{ISI} + \frac{\alpha}{\rho} R_n = \alpha\left(R_{ISI} + \frac{1}{\rho} R_n\right) \qquad \text{Eq. 16}$$

Similar to the LS procedure described earlier for the estimation of $\alpha$ and $\beta$, the LS solution for $\alpha$ is given by $$\alpha = (A^T A)^{-1} A^T p \qquad \text{Eq. 17}$$

where $$A = \begin{bmatrix} \text{Re}\{\tilde{r}_1\} \\ \text{Im}\{\tilde{r}_1\} \\ \text{Re}\{\tilde{r}_2\} \\ \text{Im}\{\tilde{r}_2\} \\ \vdots \\ \text{Re}\{\tilde{r}_K\} \\ \text{Im}\{\tilde{r}_K\} \end{bmatrix}, p = \begin{bmatrix} \text{Re}\{\hat{r}_1\} \\ \text{Im}\{\hat{r}_1\} \\ \text{Re}\{\hat{r}_2\} \\ \text{Im}\{\hat{r}_2\} \\ \vdots \\ \text{Re}\{\hat{r}_K\} \\ \text{Im}\{\hat{r}_K\} \end{bmatrix}, \text{ and} \qquad \text{Eq. 18}$$

$$\tilde{r} = r_{ISI,k} + \frac{1}{\rho} r_{n,k} \qquad \text{Eq. 19}$$

with k=1, ..., K. Note that now A is a matrix with only one column and there is no matrix inversion involved because the quantity to invert is scalar.

In another embodiment, which is a variation of the above method, the parametric G-RAKE receiver circuit 34 imposes the condition that $\beta$ is proportional to $\alpha$ according to some defined relationship. On that basis, the LS fitting process is modified by expressing the measured impairment correlations as a function of $\alpha$ only, and then solving for $\alpha$ using Eq. 16-Eq. 19. Once $\alpha$ is determined, then the defined relationship is used to calculate $\beta$.

In the above embodiments, robust estimates for the scaling parameters are obtained on a per slot basis, for example, by generating instantaneous values for $\alpha$ and $\beta$ and applying bounding to one or both of the instantaneous values. Such bounding prevents, for example, the scaling parameter $\beta$ from becoming too small in relation to $\alpha$, and thus ensures that "good" working values of $\alpha$ and $\beta$ are available for impairment correlation estimation and subsequent combining weight generation in each transmission slot.

In one or more further embodiments, robust estimates for the scaling parameters are obtained by accumulating data/measurements over two or more transmission slots within a given transmission interval. That is, rather than using a single slot to estimate $\alpha$ and $\beta$, the parametric G-RAKE receiver circuit 34 may be configured to use information from multiple slots to perform the LS fitting step(s) employed to determine estimates for the scaling parameters $\alpha$ and $\beta$ within a given transmission interval.

FIG. 7 illustrates the accumulation of data/measurements over more than one transmission slot of a given transmission interval (Step 104), such that the size of the sample sets used for estimation of the scaling parameters is larger. As an example, for a three-slot transmission interval, the parametric G-RAKE receiver circuit 34 can be configured to obtain measured impairment correlations from despread pilot (or traffic) values received over all three slots, thereby providing a larger number of samples for generating the snapshot impairment correlation measurements represented by the matrix $\hat{R}$.

The parametric G-RAKE receiver circuit 34 uses the accumulated measurements to estimate instantaneous values for the scaling parameters $\alpha$ and $\beta$ (Step 106), and, optionally, may apply bounding/limiting to one or both of the instantaneous values (Step 108). However, using a larger sample set for estimating the instantaneous values of $\alpha$ and $\beta$, i.e., using more than one slot's worth of measurements, tends to lower the estimation "noise" of the scaling parameters. With the reduction in estimation noise, the LS fitting process used to obtain the scaling parameters generally yields inherently more robust results. Bounding thus may not be needed.

Mathematically, the parametric G-RAKE receiver circuit 34 solves the multiple-slot estimation problem given as $$\begin{bmatrix} \alpha \\ \beta \end{bmatrix} = (B^T B)^{-1} B^T x \qquad \text{Eq. 20}$$

where $$B = \begin{bmatrix} A^j \\ A^{j+1} \\ \vdots \\ A^{j+n} \end{bmatrix}, x = \begin{bmatrix} p^j \\ p^{j+1} \\ \vdots \\ p^{j+n} \end{bmatrix} \qquad \text{Eq. 21}$$

and $A^j$ and $p^j$ represent the A matrix and p vector for the $j^{th}$ slot of the given transmission interval.

As a variation of this method, the parametric G-RAKE receiver circuit 34 may be configured to obtain LS estimates of $\alpha$ and $\beta$ for each slot in a transmission interval (e.g. $B=A^j$, $x=p^j$), and then average the estimates together. In mathematical form, this variant is given by $$\alpha = \frac{1}{k} \sum_{j=1}^{k} \alpha(j) \qquad \text{Eq. 22}$$

and $$\beta = \frac{1}{k} \sum_{j=1}^{k} \beta(j) \qquad \text{Eq. 23}$$

where k represents the current slot index, and j indexes from the beginning of the transmission interval—e.g., TTI—to the current slot index. Note, too, that averaging over multiple slots still represents a per transmission interval solution, as slot-to-slot average generally is not carried over across transmission intervals.

In still other embodiments, the parametric G-RAKE receiver circuit 34 can be advantageously configured for use with multiple receive antennas 16. Consider two receive antennas 16, for example, where Eq. 2 becomes $$\begin{bmatrix} R_{11} & R_{12} \\ R_{21} & R_{22} \end{bmatrix} = \alpha \begin{bmatrix} R_{ISI11} & R_{ISI12} \\ R_{ISI21} & R_{ISI22} \end{bmatrix} + \beta \begin{bmatrix} R_{n11} & 0 \\ 0 & R_{n22} \end{bmatrix} \qquad \text{Eq. 24}$$

The elements of the off-diagonal blocks of the correlation matrix $R_n$ correspond to the noise correlation between fingers of different antennas, and are equal to zero. All previous embodiments may be used with multiple receive antennas. Another embodiment considers setting to zero the off-diagonal elements of the measured impairment correlation matrix R as follows $$\begin{bmatrix} R_{11} & 0 \\ 0 & R_{22} \end{bmatrix} = \alpha \begin{bmatrix} R_{ISI11} & R_{ISI12} \\ R_{ISI21} & R_{ISI22} \end{bmatrix} + \beta \begin{bmatrix} R_{n11} & 0 \\ 0 & R_{n22} \end{bmatrix} \qquad \text{Eq. 25}$$

Then the estimation of the scaling parameters $\alpha$ and $\beta$ may be done using the LS fitting process described earlier herein.

It should be noted that this method biases the estimation of the parameter $\alpha$ towards lower values, but it works well in that it reduces variation in the ratio of the scaling parameters (with respect to the case that all elements of the R matrix are used in the LS estimation). If the LS fitting process yields negative values for the scaling parameters, the parametric G-RAKE receiver circuit 34 may be configured simply to set them to zero.

As a further note, the method immediately above represents a one-step process for obtaining robust estimates of the scaling parameters $\alpha$ and $\beta$. However, it will be appreciated that a constraining step may be performed as an optional, second step, wherein the value of $\alpha$ and/or $\beta$ is bounded or otherwise limited to ensure good receiver performance.

In another embodiment, the parametric G-RAKE receiver circuit 34 uses an iterative procedure to estimate the scaling parameters. Consider a case where the transceiver 14 uses two receive antennas 16. The elements of the off-diagonal blocks of the correlation matrix $R_n$ correspond to the noise correlation between fingers of different antennas. These values are equal to zero. Therefore, for the two-antenna case, Eq. 5 becomes Eq. 24, which is repeated here as $$\begin{bmatrix} R_{11} & R_{12} \\ R_{21} & R_{22} \end{bmatrix} = \alpha \begin{bmatrix} R_{ISI11} & R_{ISI12} \\ R_{ISI21} & R_{ISI22} \end{bmatrix} + \beta \begin{bmatrix} R_{n11} & 0 \\ 0 & R_{n22} \end{bmatrix} \quad \text{Eq. 26}$$

One sees from the above expression that the value of $\beta$ does not depend on the off-diagonal blocks. Thus, estimation of $\beta$ can be done using only the diagonal blocks. Two steps are used to estimate $\alpha$ and $\beta$. First, only the diagonal blocks are used to estimate both parameters, with these initial estimates denoted as $\alpha_1$ and $\beta_1$. A suitable expression for this is given as $$\begin{bmatrix} R_{11} & 0 \\ 0 & R_{22} \end{bmatrix} = \alpha \begin{bmatrix} R_{ISI11} & 0 \\ 0 & R_{ISI22} \end{bmatrix} + \beta \begin{bmatrix} R_{n11} & 0 \\ 0 & R_{n22} \end{bmatrix} \quad \text{Eq. 27}$$

Then, $\beta$ is set to the estimated value $\beta=\beta_1$ and Eq. 26 is used to re-estimate the parameter $\alpha$, denoted as $\alpha_2$. The scaling parameter $\beta$ is then re-estimated by setting $\alpha=\alpha_2$ and using Eq. 27 to determine $\beta_2$. The iteration between fixing $\beta$ and re-estimating $\alpha$ using Eq. 26, then fixing $\alpha$ and re-estimating $\beta$ using Eq. 27 can be repeated a pre-determined number of times or until satisfying a defined stopping criteria. In general, then, estimating the scaling parameters on a per transmission interval basis may be based on initially estimating first and second scaling parameters and then iteratively using the estimate for one of the first and second scaling parameters to revise the estimate for the other one of the first and second scaling parameters FIG. 8 illustrates another embodiment of iterative scaling parameter determination, which stands as a variation of the above approach. Processing begins with estimation of $\alpha_1$ and $\beta_1$ from the diagonal blocks as described above (Step 120). Processing continues with the calculation of the ratio $$\psi_1 = \frac{\alpha_1}{\beta_1}$$

(Step 122). The value $\beta_2=\beta_1$ is then used to estimate $\alpha_2$ via the LS fitting process (Step 124), and a new ratio $$\psi_2 = \frac{\alpha_2}{\beta_2}$$

is calculated (Step 126). The two ratios $\psi_1$ and $\psi_2$ are tested in comparison to a defined threshold $\rho$ (Step 128). If both of the ratios exceed the value of $\rho$, then the scaling parameters $\alpha$ and $\beta$ corresponding to the smallest one of the two ratios are used, with $\beta$ constrained according to a defined threshold (bounded) as a function of $\alpha$ (Step 130).

Alternatively, if only one of the ratios does not exceed the threshold $\rho$, then the values of the scaling parameters $\alpha$ and $\beta$ corresponding to that ratio are used. Thus, if $\psi_1$ exceeds the threshold and $\psi_2$ is below the threshold (checked by the combination of Steps 128 and 132), then the scaling parameters corresponding to $\psi_2$ are used (Step 134). Conversely, if $\psi_2$ exceeds the threshold and $\psi_1$ is below the threshold (checked by the combination of Steps 128 and 132), then the scaling parameters corresponding to $\psi_1$ are used (Step 136).

In another iterative solution embodiment, the parametric G-RAKE receiver circuit 34 is configured to improve its estimation of the scaling parameters $\alpha$ and $\beta$ by exploiting additional information available to it. For example, the received communication signal generally includes error correction codes and/or error detection codes that may be used to improve scaling parameter estimation.

For example, assuming that a Cyclic Redundancy Check (CRC) value is provided for each (received signal) coding block, the parametric G-RAKE receiver circuit 34 can improve its scaling parameter estimation by trying different candidate pairs of the scaling parameters $\alpha$ and $\beta$. For each candidate pair, the received signal is demodulated and decoded, and the CRC is checked. All candidate pairs of parameters corresponding to a CRC that does not check are discarded. The process continues for all candidate pairs until the CRC checks or all candidate pairs are processed. Note that one coding block can correspond to multiple transmission slots and different transmission slots can use different scaling parameters. In such cases, the candidate pair refers to the set of pairs of parameters of all slots in a block.

There are several ways to decide on a good candidate set. For instance, assume that the parametric G-RAKE receiver circuit obtains initial estimates of $\alpha$ and $\beta$. With these initial estimates, it can then create a set of candidate pairs by modifying the nominal values $\alpha$ and $\beta$, such as by $\alpha=\alpha+\epsilon_1$ and $\beta=\beta+\epsilon_2$, where $\epsilon_1$ and $\epsilon_2$ can be chosen as fractions of $\alpha$ and $\beta$ respectively. Another way is to try different ratios of $\alpha$ to $\beta$. Of course, other approaches to obtaining the candidate set of scaling parameter pairs may be used, and those skilled in the art will appreciate that the above example is non-limiting.

Yet another embodiment of scaling parameter estimation uses a two-step scaling parameter determination process that is valid for real-valued receive filters. (Real-valued receiver filters are reasonable assumption for most WCDMA receiver implementations, for example.) Recalling the impairment correlations expression given in Eq. 2, if the receive filter is real-valued, then $R_n$ is real. Since $\beta$ must be real, the imaginary entries of the impairment correlation matrix R are a function of $\alpha$ only. Conceptually, the parametric G-RAKE receiver circuit 34 can solve for $\alpha$ first using the imaginary entries, and then solve for $\beta$ using the real entries plus the value computed for $\alpha$. In terms of a detailed procedure, this embodiment consists of the following steps: (1) solve a least squares problem for $\alpha$ given the over-determined system of equations imaginary($\hat{R}$)≈$\alpha$[imaginary($R_{ISI}$)]; and (2) using the $\alpha$ from Step (1), solve a least squares problem for $\beta$ given the over-determined system of equations real($\hat{R}-\alpha R_{ISI}$)≈$\beta R_n$.

Regardless of which one or combination of the above embodiments is implemented, the present invention teaches a wireless communication device or system, e.g., the transceiver 14, that uses parametric G-RAKE processing based on per interval estimation of the scaling parameters. Per interval estimation improves the impairment correlation and corresponding combining weight calculations performed as part of G-RAKE processing in circumstances where the conditions bearing on scaling parameter estimation potentially change rapidly between transmission intervals. As such, scaling parameter estimation on a per interval basis generally prevents the scaling parameters estimated in one transmission interval of a received communication signal from being influenced by the scaling parameters estimated in another transmission interval of the received communication signal.

On that point, the term "per interval basis" as used herein should be given broad construction. For example, some embodiments of scaling parameter estimation taught herein do carry over scaling parameters from one time slot to another, i.e., the scaling parameter(s) estimated in one time slot are reused in one or more subsequent time slots. However, to the extent that new values for the scaling parameter(s) are being calculated within a given transmission interval, those calculations are driven by the signal conditions prevailing during all or part of that given transmission interval.

With that broad understanding in mind, those skilled in the art will appreciate that the present invention is not limited to the foregoing features and advantages. Instead, the present invention is limited only by the following claims and their legal equivalents.

What is claimed is:

1. A method of estimating one or more scaling parameters used to scale modeled impairment correlations in a parametric Generalized RAKE (G-RAKE) receiver comprising:
    estimating the scaling parameters on a per transmission interval basis such that the scaling parameters estimated in one transmission interval of a received communication signal are not influenced by the scaling parameters estimated in another transmission interval of the received communication signal;
    wherein each transmission interval comprises one or more transmission slots, and wherein estimating the scaling parameters on a per transmission interval basis comprises:
        estimating the scaling parameters based on measured impairment correlations obtained over more than one transmission slot of the transmission interval;
        expressing the measured impairment correlations as a function of modeled interference correlations scaled by a first scaling parameter and modeled noise correlations scaled by a second scaling parameter;
        bounding the second scaling parameter according to a defined limit or range; and
        solving the function for the first and second scaling parameters.

2. A method of estimating one or more scaling parameters used to scale modeled impairment correlations in a parametric Generalized RAKE (G-RAKE) receiver comprising:
    estimating the scaling parameters on a per transmission interval basis such that the scaling parameters estimated in one transmission interval of a received communication signal are not influenced by the scaling parameters estimated in another transmission interval of the received communication signal;
    wherein each transmission interval comprises one or more transmission slots, and wherein estimating the scaling parameters on a per transmission interval basis comprises estimating the scaling parameters on a per slot basis; and
    wherein estimating the scaling parameters on a per slot basis comprises:
        estimating the scaling parameters in a given transmission slot based on measured impairment correlations obtained for the transmission slot; and
        constraining the scaling parameters according to one or more defined limits.

3. The method of claim 2, wherein estimating the scaling parameters based on measured impairment correlations obtained for the transmission slot comprises expressing the measured impairment correlations as a function of modeled interference correlations scaled by a first scaling parameter and modeled noise correlations scaled by a second scaling parameter, and solving the function for the first and second scaling parameters.

4. The method of claim 3, wherein constraining the scaling parameters according to one or more defined limits comprises limiting the value of the second scaling parameter according to a defined range or limit.

5. The method of claim 2, wherein estimating the scaling parameters based on measured impairment correlations obtained for the transmission slot comprises expressing the measured impairment correlations as a function of modeled interference correlations scaled by a first scaling parameter and modeled noise correlations scaled by a second scaling parameter expressed in terms of the first scaling parameter, and solving the function for the first scaling parameter.

6. The method of claim 5, wherein constraining the scaling parameters according to one or more defined limits comprises determining the second scaling parameter from the first scaling parameter, such that the value of the second scaling parameter is constrained according to the value of the first scaling parameter.

7. A method of estimating one or more scaling parameters used to scale modeled impairment correlations in a parametric Generalized RAKE (G-RAKE) receiver comprising:
    estimating the scaling parameters on a per transmission interval basis such that the scaling parameters estimated in one transmission interval of a received communication signal are not influenced by the scaling parameters estimated in another transmission interval of the received communication signal;
    wherein each transmission interval of the received communication signal comprises one or more transmission slots, and
    wherein estimating the scaling parameters on a per transmission interval basis comprises:
        estimating candidate values for the scaling parameters for all or part of a given transmission interval;
        processing the received communication signal according to the candidate values;
        discarding candidate values that are detected as yielding incorrect decoding of the received communication signal; and
        selecting one or more of the candidate values not discarded.

8. A method of estimating one or more scaling parameters used to scale modeled impairment correlations in a parametric Generalized RAKE (G-RAKE) receiver comprising:
    estimating the scaling parameters on a per transmission interval basis such that the scaling parameters estimated in one transmission interval of a received communication signal are not influenced by the scaling parameters estimated in another transmission interval of the received communication signal;
    wherein estimating the scaling parameters on a per transmission interval basis comprises obtaining measured impairment correlations for all or part of a given transmission interval, expressing imaginary components of the measured impairment correlations as a function of modeled interference correlations scaled by a first scaling parameter and solving the function of modeled interference correlations scaled by the first scaling parameter for the first scaling parameter, expressing modeled noise correlations as scaled by the second scaling parameter as a real component function of real components of the measured impairment correlations and real components of the modeled interference correlations as scaled by the first scaling parameter and solving the real component function for the second scaling parameter.

9. A method of estimating one or more scaling parameters used to scale modeled impairment correlations in a parametric Generalized RAKE (G-RAKE) receiver comprising:
estimating the scaling parameters on a per transmission interval basis such that the scaling parameters estimated in one transmission interval of a received communication signal are not influenced by the scaling parameters estimated in another transmission interval of the received communication signal;
wherein the received communication signal comprises two or more received communication signals received on two or more receive antennas; and
wherein estimating the scaling parameters on a per transmission interval basis comprises:
obtaining measured impairment correlations for all or part of a given transmission interval;
zeroing off-diagonal elements of the measured impairment correlations to account for zero noise correlations between different receive antennas;
expressing the measured impairment correlations after said zeroing as a function of modeled interference correlations scaled by a first scaling parameter and modeled noise correlations as scaled by a second scaling parameter; and
solving the function for the first and second scaling parameters.

10. The method of claim 2, wherein estimating the scaling parameters on a per transmission interval basis comprises initially estimating first and second scaling parameters and then iteratively using the estimate for one of the first and second scaling parameters to revise the estimate for the other one of the first and second scaling parameters.

11. A parametric Generalized RAKE (G-RAKE) receiver circuit comprising:
one or more processing circuits configured to estimate one or more scaling parameters used to scale modeled impairment correlations in the parametric Generalized RAKE (G-RAKE) receiver by estimating the one or more scaling parameters on a per transmission interval basis such that the scaling parameters estimated in one transmission interval of a received communication signal are not influenced by the scaling parameters estimated in another transmission interval of the received communication signal;
wherein each transmission interval comprises one or more transmission slots, and wherein the one or more processing circuits are configured to estimate the scaling parameters on a per transmission interval basis by:
estimating the scaling parameters based on measured impairment correlations obtained over more than one transmission slot of the transmission interval;
expressing the measured impairment correlations as a function of modeled interference correlations scaled by a first scaling parameter and modeled noise correlations scaled by a second scaling parameter;
bounding the second scaling parameter according to a defined limit or range; and
solving the function for the first and second scaling parameters.

12. A parametric Generalized RAKE (G-RAKE) receiver circuit comprising:
one or more processing circuits configured to estimate one or more scaling parameters used to scale modeled impairment correlations in the parametric Generalized RAKE (G-RAKE) receiver by estimating the one or more scaling parameters on a per transmission interval basis such that the scaling parameters estimated in one transmission interval of a received communication signal are not influenced by the scaling parameters estimated in another transmission interval of the received communication signal;
wherein each transmission interval comprises one or more transmission slots; and
wherein the one or more processing circuits are configured to estimate the scaling parameters on a per slot basis based on measured impairment correlations obtained for the transmission slot, and constrain the scaling parameters according to one or more defined limits.

13. The parametric G-RAKE receiver circuit of claim 12, wherein the one or more processing circuits are configured to express the measured impairment correlations as a function of modeled interference correlations scaled by a first scaling parameter and modeled noise correlations scaled by a second scaling parameter, and solve the function for the first and second scaling parameters.

14. The parametric G-RAKE receiver circuit of claim 13, wherein the one or more processing circuits are configured to constrain the scaling parameters according to one or more defined limits by limiting the value of the second scaling parameter according to a defined range or limit.

15. The parametric G-RAKE receiver circuit of claim 12, wherein the one or more processing circuits are configured to estimate the scaling parameters based on measured impairment correlations obtained for the transmission slot by expressing the measured impairment correlations as a function of modeled interference correlations scaled by a first scaling parameter and modeled noise correlations scaled by a second scaling parameter expressed in terms of the first scaling parameter, and solving the function for the first scaling parameter.

16. The parametric G-RAKE receiver circuit of claim 15, wherein the one or more processing circuits are configured to constrain the scaling parameters according to one or more defined limits by determining the second scaling parameter from the first scaling parameter, such that the value of the second scaling parameter is constrained according to the value of the first scaling parameter.

17. The parametric G-RAKE receiver circuit of claim 12, wherein the one or more processing circuits are configured to estimate the scaling parameters on a per transmission interval basis by initially estimating first and second scaling parameters and then iteratively using the estimate for one of the first and second scaling parameters to revise the estimate for the other one of the first and second scaling parameters.

* * * * *